UNITED STATES PATENT OFFICE 2,520,101

SULFURIZED UNSATURATED KETONES

Ferdinand P. Otto, Woodbury, N. J., and Ronald E. Meyer, Cumberland, Md., assignors to Socony-Vacuum Oil Company, Incorporated, a corporation of New York No Drawing. Application March 29, 1945, Serial No. 585,572

5 Claims. (Cl. 260—327)

This invention has to do with new chemical compounds or reaction products which may be generally designated as sulfurized unsaturated ketones or as sulfur-containing reaction products of unsaturated ketones and elementary sulfur.

The present invention is predicated upon the discovery that the compounds or reaction products contemplated herein when blended with a viscous mineral oil fraction such as hydrocarbon lubricating oil, will improve various properties of the oil. For example, these compounds or reaction products will inhibit oxidation of the oil, thereby retarding the formation of sludge and acidic products. They also retard changes in viscosity in the oil, with temperature change during use. In addition, some of the compounds or reaction products are characterized by the ability to depress the pour point of oils.

It is to be understood, however, that the present invention is not concerned with mineral oil compositions, such compositions forming the subject matter of our copending application Serial No. 490,683, filed June 12, 1943, now Patent 2,419,586, of which the present application is a continuation-in-part and to which reference is made for further details in the composition of these compounds or reaction products.

It is also to be understood that the use of the compounds or reaction products contemplated herein is not confined to the improvement of mineral oils. For example, they may be used as cutting oils, rubber accelerators, extreme pressure lubricants and as intermediates in the production of other chemical compositions. Numerous other uses and applications of these compounds or reaction products will be readily apparent to those skilled in the art from the description of their composition and typical methods for preparing them, as provided hereinafter.

As aforesaid, the compounds or reaction products of the present invention are obtained by reaction of an unsaturated ketone and elementary sulfur, the unsaturated ketone having at least one olefin group

separated from the keto group by at least one carbon atom. The unsaturated ketones of the type described may be represented by the general formula (I):

I 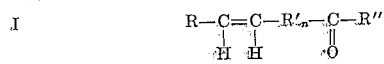

wherein R is hydrogen or an aliphatic group containing at least one carbon atom, and preferably containing from one to ten carbon atoms; R' is a methylene group, $n$ is a whole number from zero to ten; and R'' is an aliphatic group containing at least one carbon atom, and when containing two or more carbon atoms may be saturated or unsaturated. Typical ketones of this type are phorone, allyl acetone, diallyl acetone, dioleyl ketone, etc.

It will be apparent from general formula (I) that the unsaturated ketones may be symmetrical or unsymmetrical (mixed) ketones, and that the symmetrical ketones, which are preferred herein, will be represented by the following general formula (II):

II 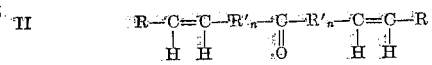

wherein R, R' and $n$ are as defined above. It will be seen, therefore, that the symmetrical ketones are characterized by the linkage

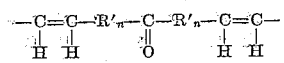

wherein R' and $n$ are as previously defined above. Particularly preferred of the ketones having this structure is dioleyl ketone.

It is believed that the chemical reaction involved in the sulfurization of the aforesaid ketones may be represented by the following Equation III.

III 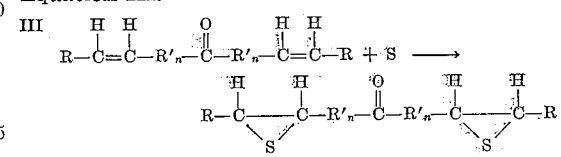

wherein R, R' and $n$ are as previously defined. This representation is supported by the fact that practically no hydrogen sulfide is evolved during the reaction.

While completely sulfurized ketones of the type shown in Equation III are preferred herein, those sulfurized ketones in which not all of the olefin groups are sulfurized are effective improving agents and, accordingly, are contemplated herein.

In general the sulfurized ketones of this invention are prepared by reacting a ketone of the type described above with elementary sulfur at elevated temperatures until all of the sulfur has chemically combined. It is considered that all of the sulfur has chemically combined with the ketone when the sulfurized ketone obtained therewith is non-corrosive, as indicated by only a slight tarnish of discoloration of a polished copper strip, immersed in a 1% blend of the reaction product in mineral oil and heated to 150° C. for 3 hours. Although the amount of elementary sulfur used in the preparation may be varied considerably, such as from about 5% to about 40%, it is preferred to use from about 5% to about 15% by weight of the ketone used. While elevated temperatures greater than about 150° C. may be used, the preferred temperature range is from about 175° C. to about 195° C. The preferred temperature range has been found to be particularly advantageous inasmuch as undesirable side reactions, which produce unsatisfactory by-products, are kept to a minimum. Consequently, less refining of the non-corrosive sulfurized ketone is necessary. During the reaction, it is desirable, but not necessary, to introduce a non-oxidizing or inert gas such as nitrogen into the reaction mixture; the use of an inert gas at this stage makes it possible to obtain a lighter-colored product and minimizes the formation of undesirable by-products. Sulfurized ketones so obtained may be further refined, to improve their color by contact with activated clay or other decolorizing materials.

It has been found that the color of the ketone used in the reaction with sulfur greatly influences the color intensity of the sulfurized product obtained therefrom. For example, when a light, pale-yellow oleone (dioleyl ketone) is heated with sulfur for 4 hours, the brown non-corrosive viscous liquid which results imparts only a slight discoloration to a mineral oil when blended therewith in minor proportions. However, when a less refined, green oleone is sulfurized and blended as before, a considerably darker mineral oil composition is obtained. The procedure outlined above may be modified by the use of an inert diluent such as a petroleum oil during the sulfurization of the ketone. The diluent will then be removed after the reaction has proceeded to completion. It will be apparent, however, that a mineral lubricating oil may be used as the diluent and the resultant reaction mixture will be a blend or concentrate of the sulfurized ketone in mineral oil.

In order that the character of the sulfurized ketones of this invention may be better understood the following illustrative examples are provided below:

EXAMPLE 1

(a) Reaction mixture 200 grams of oleone (dioleyl or diheptadecenyl ketone)
24 grams elementary sulfur
Nitrogen gas

(b) Procedure

Twenty-four (24) grams of sulfur were added slowly over a ½ hour period to 200 grams of oleone in a reaction vessel equipped with a mechanical stirrer, upright condenser, thermometer and an inlet tube extending to within a few inches above the reaction mixture. The nitrogen gas is introduced through the inlet tube in order to maintain a non-oxidizing atmosphere. During the addition of sulfur the reaction mixture is stirred and heated from about 110° C. to about 150° C. The reaction is mildly exothermic, and the temperature was raised slowly up to about 175° C. where it was held for 4 hours. The reaction was considered complete, that is, that all of the sulfur was chemically combined, when the reaction product caused only a small amount of tarnish or discoloration on a polished copper strip immersed in a 1% blend of the reaction product in mineral oil and heated at 150° C. for 3 hours. The product, sulfurized oleone, is a viscous, brown oil containing 10.5 per cent sulfur.

EXAMPLE 2

(a) Reaction mixture 100 grams of phorone
23.2 grams of elementary sulfur
Benzene
Nitrogen gas

(b) Procedure

Sulphur and phorone were mixed together in a reaction vessel equipped as described in Example 1 (b). The mixture was heated to 150–160° for 2 hours, during which time the mixture was stirred and nitrogen gas was bubbled therethrough in order to maintain a non-oxidizing medium. Twenty (20) grams of Super-Filtrol (a decolorizing clay of the activated montmorillonite type represented by the ideal formula $Al_2Si_4O_{10}(OH)_2 \cdot nH_2O$ (wherein $n$ is an integer), which has been activated by a suitable acid treatment) was then added to the reaction mixture, and the resulting mixture was stirred for about 15 minutes at 100° C. The mixture was then filtered (through Super-Filtrol), and the filter aid (Super-Filtrol) was washed with benzene, the benzene washings being combined with the filtrate. The benzene was then removed from the filtrate by distilling the latter to a maximum temperature of 110° C. at 5 mms. pressure. The benzene-free product thus obtained was then distilled and three fractions obtained. The first fraction, 30 grams, was obtained at 110–170° C. at 5 mms. pressure; it was a yellow-red oil containing 6.8% sulfur. The second fraction, 21 grams, was obtained at 170–190° C. at 5 mms. pressure; it, too, was a yellow-red oil, but contained 17.3% sulfur. The third fraction, 43 grams, was the residue; it was tar-like in character and contained a higher percentage of sulfur than either fraction one or two.

It is to be understood that although we have described certain preferred procedures for preparing the reaction products contemplated herein and have shown illustrative reaction products, the invention is not limited to the particular procedures or products, but includes within its scope such changes and modifications as fairly come within the spirit of the appended claims.

We claim:

1. As a new composition of matter, a sulfurized aliphatic ketone selected from the sulfurized aliphatic ketones represented by the general formulae:

(a) 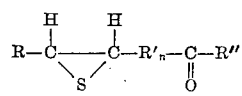

and b) 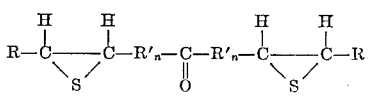

in which formulae, R represents a radical selected from hydrogen and an alkyl group having from one to ten carbon atoms, R' represents a methylene group, $n$ represents a whole number from zero to ten and R'' represents an aliphatic radical having from one to ten carbon atoms and which may contain an olefinic bond, the total number of carbon atoms in said sulfurized aliphatic ketone being from about 5 to about 35 carbon atoms.

2. As a new composition of matter, the compound

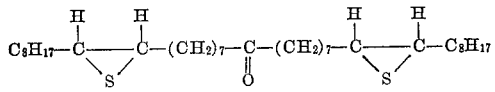

3. As a new composition of matter, the compound

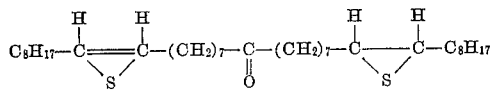

4. As a new composition of matter, the compound

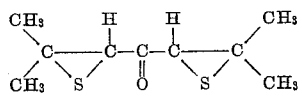

5. As a new composition of matter, the compound

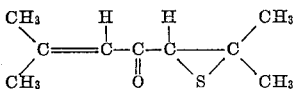

FERDINAND P. OTTO.
RONALD E. MEYER.

REFERENCES CITED

The following references are of record in the file of this patent:

UNITED STATES PATENTS

| Number | Name | Date |
|---|---|---|
| 2,179,066 | Smith | Nov. 7, 1939 |
| 2,254,756 | Segessemann | Sept. 2, 1941 |
| 2,372,160 | Morris | Mar. 20, 1945 |
| 2,372,161 | Morris | Mar. 20, 1945 |
| 2,419,586 | Otto et al. | Apr. 29, 1947 |